United States Patent [19]
Wirth

[11] Patent Number: 5,315,883
[45] Date of Patent: May 31, 1994

[54] LOAD MEASURING DEVICE
[75] Inventor: Johannes Wirth, Zurich, Switzerland
[73] Assignee: Wirth Gallo Messtechnik AG, Zurich, Switzerland
[21] Appl. No.: 853,711
[22] PCT Filed: Oct. 2, 1991
[86] PCT No.: PCT/CH91/00207
§ 371 Date: Jun. 4, 1992
§ 102(e) Date: Jun. 4, 1992
[87] PCT Pub. No.: WO92/06357
PCT Pub. Date: Apr. 16, 1992

[30] Foreign Application Priority Data
Oct. 8, 1990 [CH] Switzerland ............. 3237/90
[51] Int. Cl.⁵ ................................. G01L 1/00
[52] U.S. Cl. ................. 73/862.59; 73/862.381; 177/137
[58] Field of Search ............ 177/137, 138; 73/862.632, 862.637, 862.59

[56] References Cited
U.S. PATENT DOCUMENTS

| | | | |
|---|---|---|---|
| 3,241,626 | 3/1966 | Woodburn | 177/137 |
| 3,247,917 | 4/1966 | Balke | 177/137 |
| 3,480,095 | 11/1969 | Tuchman | 177/137 |
| 3,794,130 | 2/1974 | Malmgren et al. | 177/137 |
| 4,042,049 | 8/1977 | Reichow et al. | 177/137 |
| 4,118,977 | 10/1978 | Olsen et al. | 73/862.59 |

Primary Examiner—Richard E. Chilcot, Jr.
Assistant Examiner—R. Biegel
Attorney, Agent, or Firm—Johnson & Gibbs

[57] ABSTRACT

The load measuring device according to the invention comprises at least three identical force meters that together support the frame (2) and, for example, are supported on the chassis (1) of a truck. The individual force meter comprises a flexural spring (10) as primary spring of an elastic reduction, and a further flexural spring (17) as secondary spring of the elastic reduction. A force transducer (18) with at least one perpendicularly oscillating cord is inserted between the center section (15) of the flexural spring (10) and the center of the flexural spring (17); this force transducer (18) measures the reduced force flow subject to the firmness of the flexural springs (10 and 17). The outside sections (13) of the flexural spring (10), for example, are connected to the frame (2), and the center section (15), for example, is connected to the chassis (1). The flexural spring (10) in the compression direction has a flat inertia ellipse, therefore in the transverse direction is substantially firmer than in the compression direction, and in contrast is relatively torsionally soft with regard to torques in the horizontal axis.

16 Claims, 7 Drawing Sheets

LOAD MEASURING DEVICE

The present invention concerns a load measuring device for large weigh-bridges with several force measuring devices, particularly on the bodies of trucks.

Several load measuring devices for trucks are known. They can be divided into two classes: first, those that measure the axle loads; second, those that are connected between the chassis and body. The present invention therefore concerns load measuring devices of the second listed class. Several of such devices are known, thus, for example, from WO 85/02587; Brit. 2,208,935 A; U.S. Pat. No. 4,095,659; U.S. Pat. No. 4,020,911; WO 89/08568; and Brit. 2,220,758 A. The problem posed for all the listed devices is the insertion of the force measuring devices between the vehicle chassis and body. In WO 85/02587 and WO 89/08568 with the cited invention being situated just at the margin of the state of the art, this is solved in that the body being measured is supported on four struts that in each case contain a force measuring device. In Brit 2,208,935 A, the load of the vehicle body being measured acts upon elastic elements; the elastic elements deformed by the buildup of compressive- and/or shear stresses contain linear differential transformers that directly measure the changing size of the cited elastic elements. Load measuring devices for timber transporting trucks are known from U.S. Pat. No. 4,095,659 and U.S. Pat. No. 4,020,911. For example these trucks exhibit four force measuring devices. Each force measuring device comprises two symmetrically arranged flexural springs whose deflection is determined with elongation measuring strips.

It is common to all known solutions that their use stipulates either drastic modifications of the body of the truck or they are only suitable for special tasks. Generally they also take up much space in the vertical direction.

The goal that will be achieved by the present invention is the creation of a weighing device comprising several force measuring devices that can be inserted between the chassis and body without substantial interference with the structure of a truck manufactured on production lines.

Further, the load measuring device according to the invention will measure the load with a high resolution of at least 1/1000; it will support the body of a truck or the weighing platform with consideration of vertical and horizontal accelerations and will ensure the linkage of chassis/body as point connections of high firmness in all directions and will ensure moderate torsional firmness in all directions.

The achievement of the goal is depicted in Patent claim 1. The concept of the invention is explained in more detail with several practical examples by use of the attached drawings. The following are shown:

Figure 1:
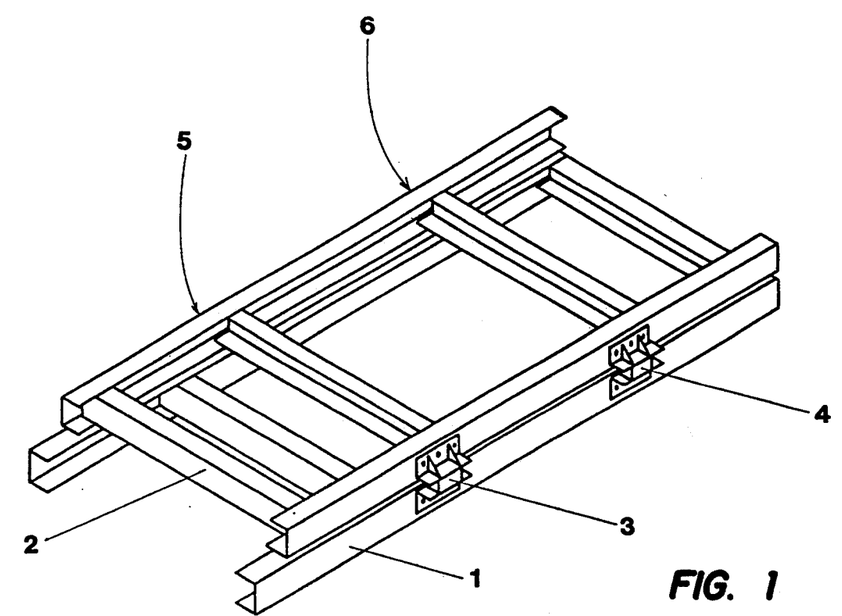
FIG. 1 an example of an overall arrangement.

FIG. 1 depicts the vehicle structure schematically. The vehicle chassis is a frame 1 welded together from C-shaped structural sections. Details specific to the vehicle such as wheel suspension, axles, cab, and the like are not depicted. A frame 2, on a structure tailored for its application, such as platforms, box bodies, tanks, is also attached with C-shaped structural sections. Usually, chassis 1 and frame 2 are connected with each other by bolts. Further, FIG. 1 shows schematically four measuring points 3, 4, 5, 6 specified in the following practical examples. The limitation to four measuring points however is by no means essential to the invention. With long platforms, six or more measuring points can also be provided; special constructions of chassis and body can also permit three points to appear reasonable.

Figure 2:
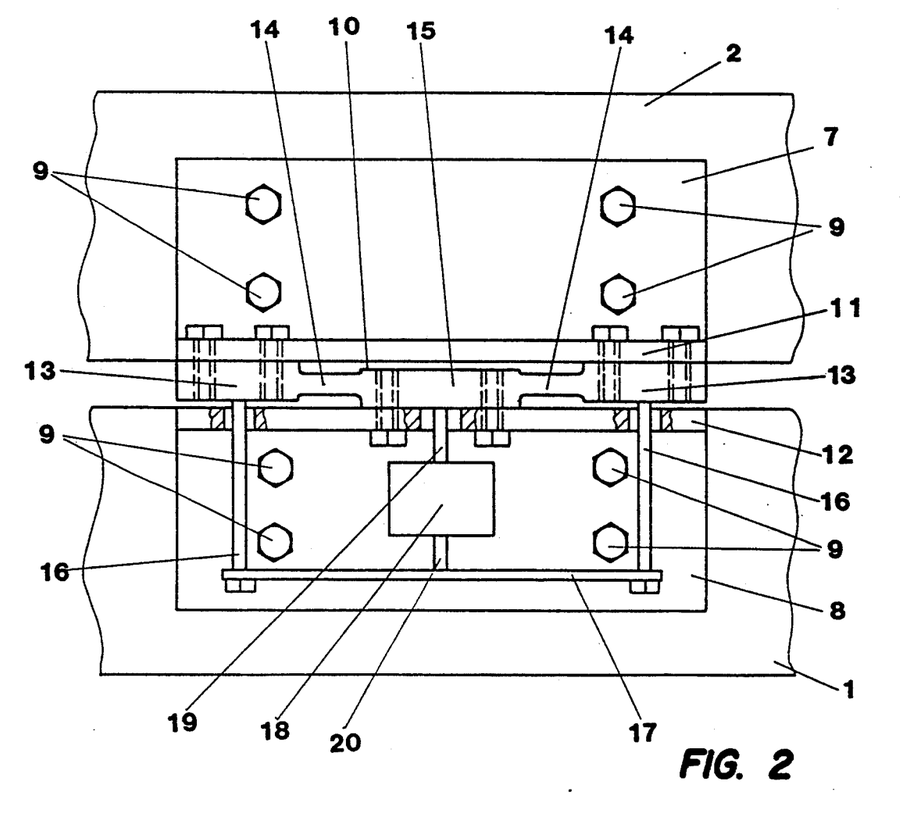
FIG. 2 a first practical example in side view.
Figure 3:
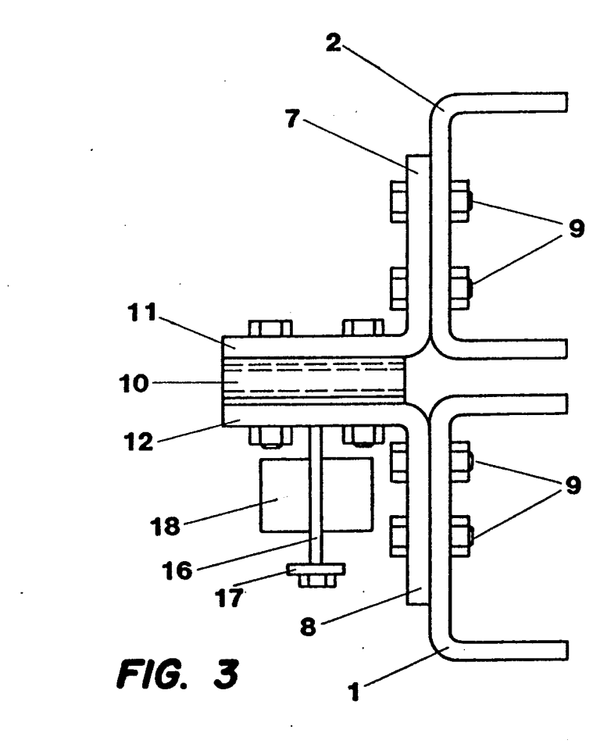
FIG. 3 a first practical example seen in longitudinal direction.

FIG. 2 shows the side view—seen from outside the vehicle—of a first practical example of a measuring point according to the invention. FIG. 3 shows a view of the same practical example in longitudinal direction of the vehicle, therefore perpendicular to the view of FIG. 2. In each case, an angle iron 7, 8 is mounted on chassis 1 and on the upper frame 2, for example with bolts 9. A flexural spring 10 is mounted between the horizontal legs 11, 12 of angle irons 7, 8; this forms the primary spring of an elastic reduction and bears the main load of the weight force acting on the measuring point. It is divided into five sections: two outside sections 13 that in this practical example are mounted on the upper leg 11; a central section 15 that is mounted on the lower leg; and two sections 14 connecting sections 13 and 15 that bend in an S-shape under the influence of the weight force being measured. Two struts 16 connecting with sections 13 bear a further flexural spring 17 that forms the secondary spring of the elastic reduction. A force transducer 18 is inserted between the center section 15 and the center of the flexural spring 17 by use of two struts 19, 20. Here, as well as n the following practical examples, the compression of the force transducer 18 under loads is assigned to the secondary spring. The force transducer 18, in this and also in all following practical examples, is of the type with at least one perpendicularly oscillating cord whose oscillating frequency is changed by the action of a load.

In the drawing, no differentiation is made between two variants of the practical example according to FIGS. 2 and 3: If a load is now applied to the measuring point, the outside sections 13 drop, therefore also the struts 16. Now either a tensile force acts on the force transducer 18 as one design variant, or the force transducer 18 is prestressed by the flexural spring 17 and is now successively relieved of stress as a second design variant. A force transducer for the second variant is known from the Swiss Patent Application 00936/90-9.

A further variant, also not depicted, for the practical example according to FIGS. 2, 3 comprises the following: Sections 13 of the flexural spring 10 are mounted on the horizontal leg 12 of the lower angle iron 8 while the center section 15 is bolted to the horizontal leg 11 of the upper angle iron 7. The struts 16 remain on sections 13 as described. Therefore, load is applied to the force transducer 18 by compressive forces.

Figure 4A:
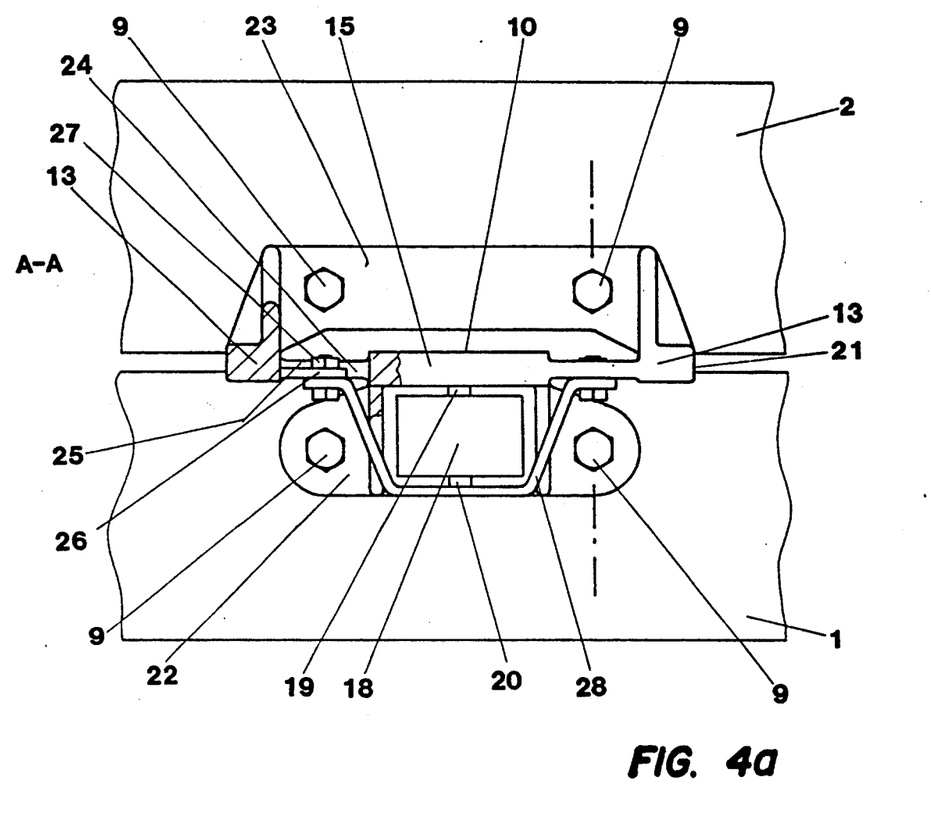
FIG. 4a, b, c a second practical example in side view, from above, and in cross section, FIG. 5a, b a third practical example in side and longitudinal view, partially in section, FIG. 6a, b a fourth practical example in the same view as FIG. 5, FIG. 7a, b a fifth practical example in the same view as FIG. 5
Figure 4B:
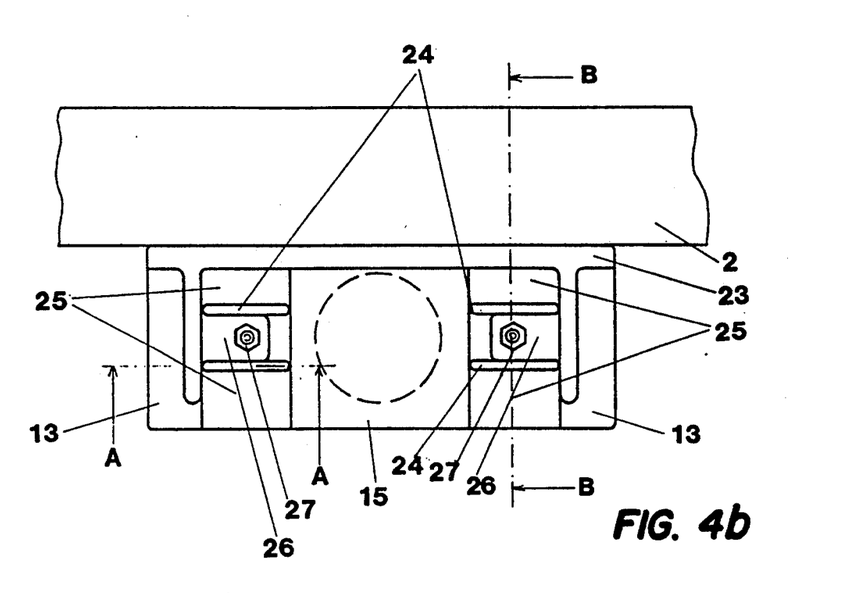
Figure 4C:
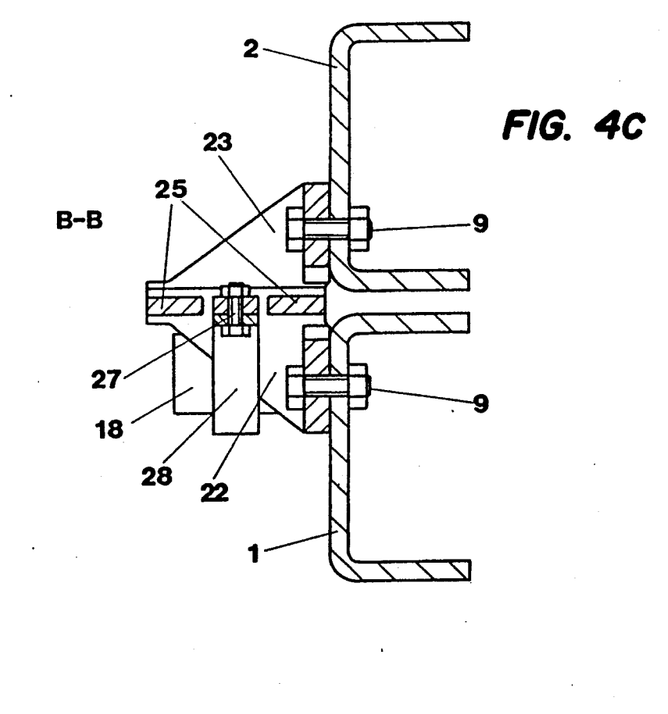

A second practical example is shown in FIG. 4a in side view, partially in section along A—A; in FIG. 4b in top view; and in FIG. 4c in cross section along B—B. The device according to the invention, as part of the overall subject of the invention, as an example, is constructed here as a cast piece 21 divided into a lower part 22 and an upper part 23. The flexural spring 10 again comprises outside sections 13, a center section 15, and two elastically stressed sections 14, each of which is separates into two parallel parts 25 by milled recesses 24. Two tongues 26 are produced simultaneously by the milled recesses 24; these are connected with the outside sections 13. A bracket 28 forming the secondary spring of the elastic reduction is mounted on the tongues 26 by bolts 27. It supports the force transducer 18 through the lower strut 20 while the upper strut is connected force-locking with the center section 15 that is supported by the lower part 22.

The lower part 22 is bolted to chassis 1 and the upper part 23 to frame 2. Upon stressing, the center section 15 of the flexural spring 10 is lifted; therefore, the load is removed from the force transducer 18.

Figure 5A:
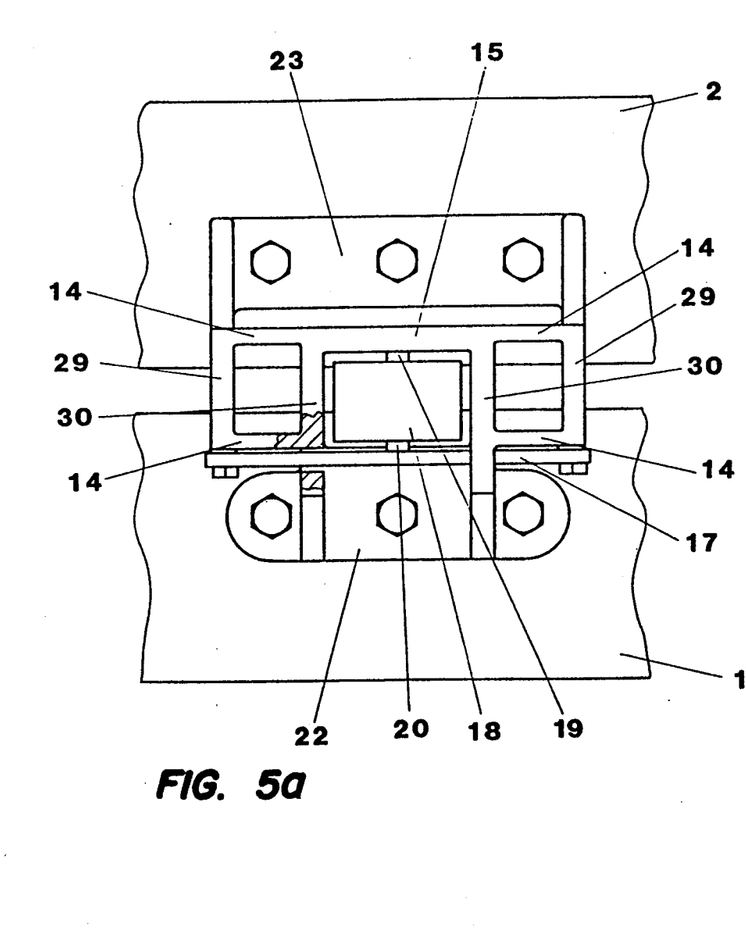
Figure 5B:
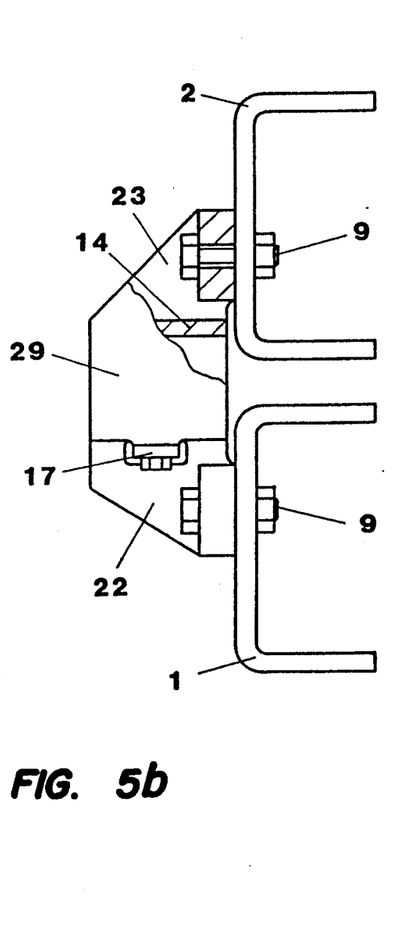

In the practical example according to FIG. 5a, b, the elastically stressed sections 14 of the flexural spring 10 in each case are designed in duplicate and lie essentially parallel to and above each other connected in each case by a plate 29. The center section 15 is connected with the lower part 22 by means of two plates 30. The flexural spring 17 (secondary spring) is bolted to the lower ends of plate 29; it acts on the force transducer 18 through the strut 20 while the center section 15 acts through strut 18. The statements made for FIGS. 2, 3 apply for FIGS. 4 and 5:

The force transducer either is stressed by tension or is prestressed by a compressive force through the flexural spring 17 or the bracket 28; it is relieved of stress successively during load application to the device.

Figure 6A:
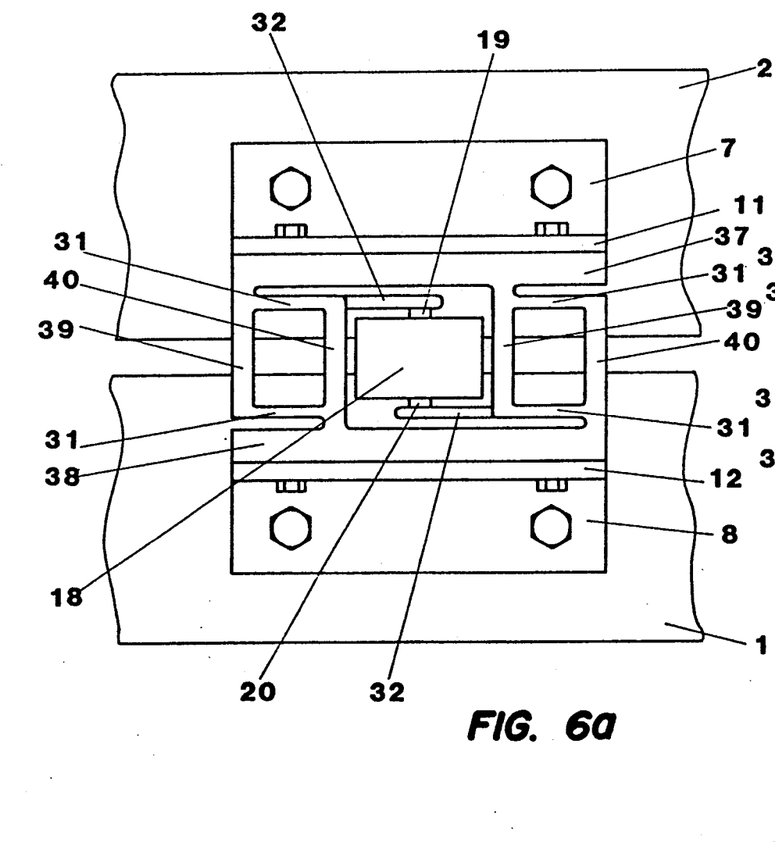
Figure 6B:
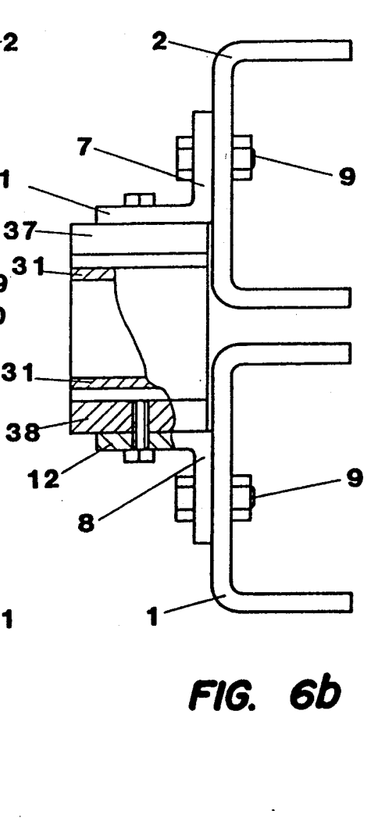

The practical example shown in FIG. 6a, b is based on parts bolted to each other. Obviously, it also may be produced in one piece as a cast part analogous to FIGS. 4 and 5.

The measuring part is mounted between the horizontal legs 11, 12 of angle irons 7, 8 known from FIG. 2. It comprises an upper horizontal plate 37 that is bolted to the horizontal leg 11 of the upper angle iron 7 and a lower horizontal plate 38 that is bolted to the horizontal leg of the lower angle iron 8. Two parallel plates 39 extend to below out from plate 37; and two plates 40 parallel to each other and the plates 39 extend from plate 38 analogously to above. Two pairs of essentially parallel leaf springs 31 arranged above each other proceed between a plate 39 and a plate 40, respectively; together these form the primary spring of the elastic reduction. A spring tongue 32 extends to the inside in the plane of the upper left pair of leaf springs 31 proceeding from the inside plate 40 as well as in the plane of the lower leaf spring 31 of the right pair proceeding from the inside plate 39. The spring tongues 32 together (always with the compression of the force transducer 18) form the secondary spring. The force transducer 18 is installed between the spring tongues 32 by means of the struts 19, 20.

The compressive force from the lower angle iron 8 bends the left pair of leaf springs 31 to above and the compressive force of upper part 7 bends the right pair of leaf spring 31 to below. That which was stated earlier applies with regard to the load application to the force transducer 18.

Figure 7A:
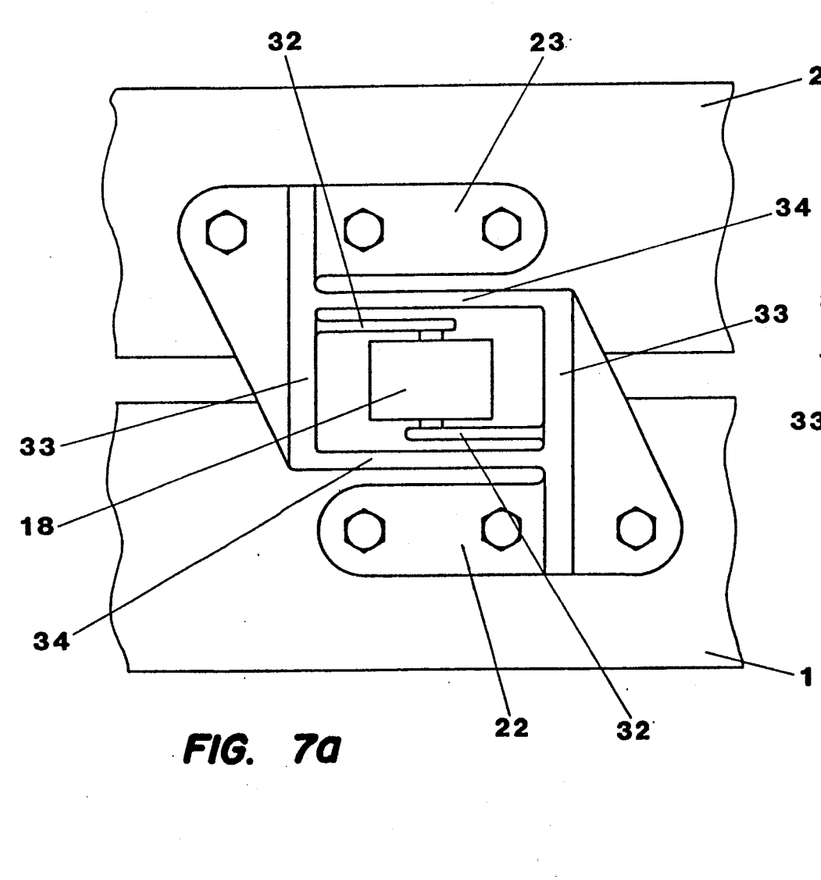
Figure 7B:
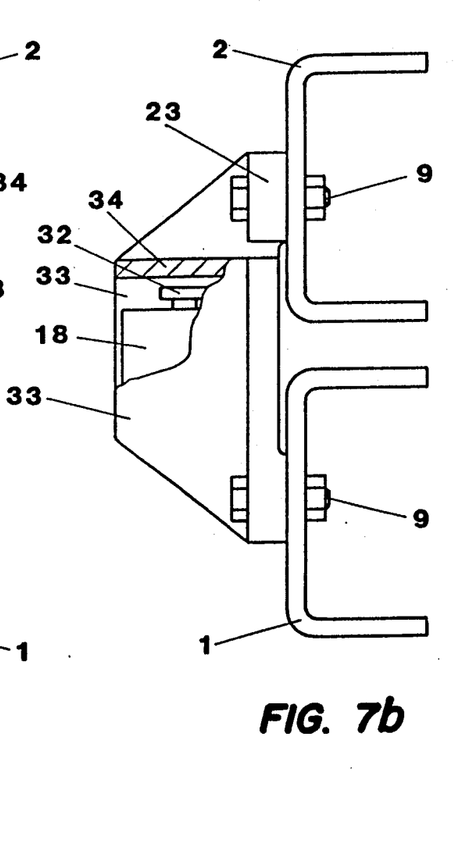

Again, the practical example according to FIG. 7 shows the construction as a cast part. In each case a plate 33 proceeds from the upper part 23 and also from the lower part 22; together these support two essentially parallel leaf springs 34. Together, these form the primary spring of the elastic reduction. Each of the plates 33 bears in turn a spring tongue 32; these also are essentially parallel to each other and to the leaf springs 34. As described, the force transducer 18 is inserted between the spring tongues 32 acting as secondary springs.

Figure 8A:
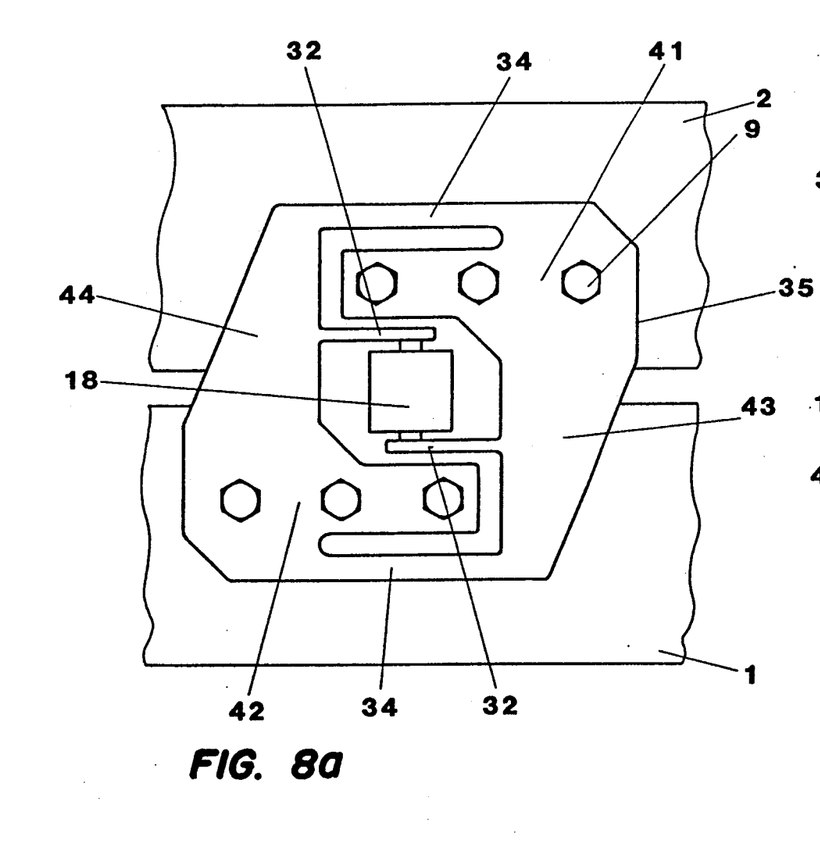
FIG. 8a, b a variant to the practical example according to FIG. 7.
Figure 8B:
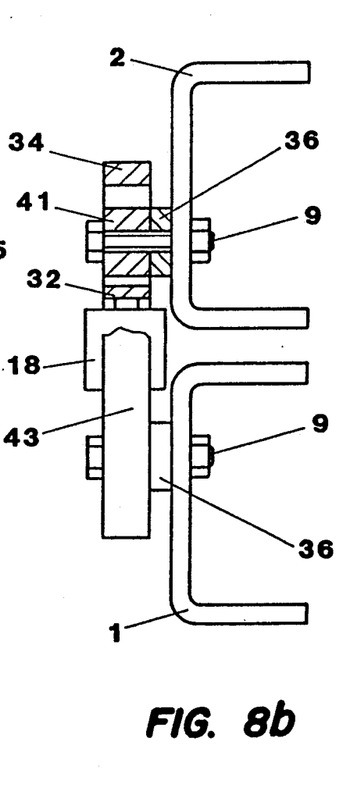

In the practical example according to FIG. 8 designed as a flat plate 35, the leaf springs 34 are placed entirely toward the outside. The mounting on chassis I is accomplished on an upper mounting part 41 and on frame 2 is accomplished on a lower mounting part 42, in each case by means of bolts 9 as in the practical examples. An essentially vertical support 43, on which the lower spring tongue 32 and one end of the lower spring 34 are fastened, proceeds to below from the mounting part 41. A substantially vertical support 44, on which the upper spring tongue 32 and one end of the upper leaf spring 34 are fastened, proceeds analogously from the lower mounting part 42 to above. The other ends of the leaf springs 34 connect to the mounting parts 41, 42. Disks 36 are inserted between chassis 1 and frame 2 on the one side and between chassis 1 and plate 35 on the other side; this also applies for the practical example according to FIG. 7. The particular advantage of the practical example according to FIG. 8 lies in its flat basic shape by which the current geometry can be produced easily, for example, by milling, torch-cutting, or wire electroerosive finishing.

It applies commonly for all described practical examples that the used terms "above" and "below" in behalf of simplicity are selected only for description of the drawings. The terms obviously are exchangeable since in the described measuring devices the force action is measured between frame 2 and chassis 1. Further, it applies for all practical examples with the exception of FIG. 8 that they are either constructed in one-, piece or from several parts bolted to each other; logically, that described by FIG. 8 is only one-piece.

As is shown clearly from the representation of all practical examples, the individual measuring devices are constructed strictly beside the support structures (therefore chassis 1 and frame 2); no part projects between chassis 1 and frame 2. Therefore, the total height is only increased insignificantly by a few millimeters, i.e., only by as much as necessary, so that chassis 1 and frame 2 do not contact each other under any operating conditions.

The load measuring device according to the invention can be mounted easily on any current truck without modification of its design. No parts of a mass-produced truck need to be exchanged or modified in any manner. The single intervention in its construction are the holes that must be drilled for the bolts 9.

Clearly, a further aspect of the concept of the invention results from the combination of FIG. 1 with the representation of the practical examples of the individual force measuring devices: The primary springs in the individual force measuring devices together bear the predominant portion of the main load of the frame 2, the superstructures, and the working load; the load portion on the secondary springs is small. The primary springs (flexural springs 10, 31, 34) have very flat inertia ellipses; therefore they are firm with respect to horizontal forces, moderately firm with respect to vertical forces (to be measured) and moderately torsionally firm with respect to moments with horizontal axis. The force measuring devices together therefore support the entire load resting on frame 2 plus the actual weight of the frame.

The electrical signals of the individual force transducers 18 according to FIGS. 2 through 8 are combined in an evaluation device corresponding to the state of the art and the individual weight values are added together. If a possible incline of the truck must be taken into consideration, a slope measuring device, such as that known, e.g., from the Swiss Patent Search 01 744/89-0, can be installed at an appropriate point.

What is claimed is:

1. Load measuring device for large weighing platforms comprising:
   at least three force measuring devices that together bear the load of the body and the weighed material, said force measuring devices are mounted laterally both on said chassis (1) and said frame (2), wherein said force measuring devices are the only supporting connections between said chassis (1) and said frame (2), said force measuring devices comprising a primary spring that bears the main load and having a first end and a second end, a secondary spring having a first end and a second end, and a force transducer, wherein said first end of said primary spring is connected to said first end of said secondary spring, and wherein said force transducer connects between said second end of said secondary spring and said second end of said primary spring,
   wherein said primary spring in each force measuring device comprises at least one flexural spring of the leaf spring type (10, 31, 34), wherein said secondary spring in each force measuring device also comprises at least one flexural spring of the leaf spring type (17, 28, 32), wherein said force transducer (18) having at least one oscillating cord that measures the force flow over the secondary spring, and
   wherein said flexural springs of the leaf spring type (10, 31, 34) exhibit flat inertia ellipses.

2. Load measuring device according to claim 1, wherein:
   said force measuring devices comprise an angle iron (7) bolted to the frame (2); an angle iron (8) bolted to the chassis (1); a flexural spring (10) as the primary spring; a flexural spring (17) as the secondary spring; two struts (16), which support the flexural spring (17); in which the flexural spring (10) is divided into two outside sections (13), which are mounted on the horizontal leg (11) of the upper angle iron (7), and a center section (15), which is mounted on the horizontal leg (12) of the lower angle iron (8), and two elastically stressed sections (14), which bend in an S-shape upon loading;
   and that further the two struts (16) are mounted on the outside section (13), and two struts (19, 20) are present, by which the force is transferred from the center section (15) and from the center of the flexural spring (17) to the force transducer (18).

3. Load measuring device according to claim 1, wherein:
   said force measurement devices comprise an angle iron (7) bolted to the frame (2); an angle iron (8) bolted to the chassis (1); a flexural spring (10) as the primary spring; a flexural spring (17) as the secondary spring; two struts (16), which support the flexural spring (17); in which the flexural spring (10) is divided into two outside sections (13), which are mounted on the horizontal leg (12) of the upper angle iron (8), and a center section (15), which is mounted on the horizontal leg (11) of the upper angle iron (7); and two elastically stressed sections (14), which bend S-shaped during load;
   and that further the two struts (16) are mounted on the outside sections (13) and two struts (19, 20) are present that transfer the force from the center section (15) and from the center of the flexural spring (17) to the force transducer (18).

4. Load measuring device according to claim 1, wherein:
   said force measuring devices comprise a cast part and a bracket (28), by which the cited cast part is divided into an upper part (23), which is mounted on frame (2); into a lower part (22), which is mounted on chassis (1); into a leaf spring (10) acting as the primary spring (in turn divided into two outside sections (13); into a center section (15) and four elastically stressed parts (25), which lie in pairs beside each other); and into two tongues (16), which are supported by the outside sections (13) and on which the bracket (28) is attached;
   and that further two structures (19, 20) are present, that transfer the force from the center section and from the center of the bracket (28) to the force transducer (18).

5. Load measuring device according to claim 1, wherein:
   said force measuring devices comprise a cast part and a flexural spring (17) acting the as secondary spring, in which the cited cast part is divided into an upper part (23), which is mounted on frame (2); into a lower part (22), which is mounted on chassis (1); into a leaf spring (10) acting as the primary spring (in turn divided into two vertical plates (29) lying on the outside; into a center section (15) and four elastically stressed parts (25), which lie over one another in pairs and essentially parallel to each other); and into two vertical plates (30), which connect the parts (25) with the center section (15);
   that the flexural spring (17) is mounted on the plates (29),
   and that further two struts (19, 20 ) are present that transfer the force from the center section and from the center of the flexural spring (17) to the force transducer (18).

6. Load measuring device according to claim 1, wherein:
   said force measuring devices comprise an angle iron (7) bolted to the frame (2); an angle iron (8) bolted to the chassis (1); a part lying between produced as a single piece, which is divided into two essentially parallel pairs of leaf springs (31) lying above each other, which together form the primary spring; an upper horizontal plate (37), which is bolted to the horizontal leg (11) of the upper angle iron (7); a lower horizontal plate (38), which is bolted to the horizontal leg (12) of the lower angle iron (12); two vertical plates (39) parallel to each other, which connect to plate (37); two plates (40) below each other and parallel to the plates (39), which connect to the lower plate (38), in which the leaf springs (31) proceed between a plate (39) and a plate (40);
   and that further a horizontal tongue (32) is incorporated on each of the vertical plates (39, 40) lying toward the inside, between which the force transducer (18) is mounted by use of two struts (19, 20).

7. Load measuring device according to claim 6, wherein the part produced in one piece is from cast iron.

8. Load measuring device according to claim 6, wherein the part produced in one piece is fabricated from flat stock by means of wire electroerosive finishing.

9. Load measuring device according to claim 6, wherein the part produced in one piece is produced from flat stock by means of torch-cutting.

10. Load measuring device according to claim 1, wherein the individual force measuring device, apart from the force transducer (18) is manufactured in one piece.

11. Load measuring device according to claim 10, wherein
the individual force measuring device is divided into an upper part (23) bolted to the frame (2); a lower part (22) bolted to the chassis (1); two pairs of leaf springs (31) lying above one another by pairs and in parallel, which together form the primary spring; an upper horizontal plate (37), which belongs to the upper part (23); a lower horizontal plate (38), which belongs to the lower part (22); two vertical plates (39) parallel to each other, which connect to the plate (37); two plates (40) lying below each other and parallel to the plates (39), which connected to the lower plate (38), in which the leaf springs (31) proceed between a plate (39) and a plate (40);
and that further a horizontal tongue (32) is incorporated on each of the vertical plates (39, 40) lying toward the inside, between which the force transducer (18) is mounted by means of two struts (19, 20).

12. Load measuring device according to claim 10, wherein
the individual force measuring device is divided into an upper part (23) bolted to the frame (2); a lower part (22) bolted to the chassis (1); a pair of essentially parallel leaf springs (34) lying above each other, which together form the primary spring; two parallel vertical plates (33) below each other, of which one connects to the upper part (23), and the other to the lower part (22), in which the leaf spring (34) proceeds between the plates (33);
and that further a horizontal tongue (32) is incorporated on each of the plates (33), between which the force transducer (18) is mounted by means of two struts (19, 20).

13. Load measuring device according to claim 12, wherein the part is produced in one piece from cast iron.

14. Load measuring device according to claim 10, wherein
the individual force measuring device is manufactured from a flat plate (35), which is divided into an upper mounting part (41), which is bolted to the frame (2); and a low mounting part (42), which is bolted to the chassis (1); a support (43) proceeding from the upper mounting part (43), running essentially vertically to below; a support (44) proceeding from the lower mounting part (42), running essentially vertically to above; two leaf springs (34) proceeding essentially parallel and horizontally, which together form the primary spring, of which the upper leaf spring runs between upper mounting part (41) and the upper end of the support (44) and the lower leaf spring runs between the lower mounting part (42) and the lower end of support (43), in such fashion that the upper leaf spring (34) lies above the upper mounting part (41), and the lower sheet spring (34) below the lower mounting part (42);
that further the plate (35) is divided into two essentially parallel spring tongues (32), which run from both supports (43, 44) toward the inside and are shifted with respect to height;
and that the force transducer (18) is mounted to the two spring tongues (32) by the use of two struts (19, 20).

15. Load measuring device according to claim 14, wherein the division of plate (25) is produced by use of wire electroerosive finishing.

16. Load measuring device according to claim 14, wherein the division of plate (25) is produced by means of torch-cutting.

* * * * *